United States Patent [19]

Nagano

[11] Patent Number: 4,636,655
[45] Date of Patent: Jan. 13, 1987

[54] CIRCUIT IN WHICH OUTPUT CIRCUIT AND OPERATIONAL AMPLIFIER EQUIPPED INPUT CIRCUIT ARE ELECTRICALLY ISOLATED

[75] Inventor: Katsumi Nagano, Shimonoseki, Japan

[73] Assignee: Kabushiki Kaisha Toshiba, Kawasaki, Japan

[21] Appl. No.: 668,832

[22] Filed: Nov. 6, 1984

[30] Foreign Application Priority Data

Nov. 11, 1983 [JP] Japan ................. 58-211876
Dec. 27, 1983 [JP] Japan ................. 58-246342

[51] Int. Cl.$^4$ ..................... H03K 5/00; H03K 3/42
[52] U.S. Cl. ........................... 307/261; 307/311; 307/490; 307/503; 328/26
[58] Field of Search ............... 307/490, 503, 311, 261; 328/26; 250/551

[56] References Cited

U.S. PATENT DOCUMENTS

| | | | |
|---|---|---|---|
| 3,112,449 | 11/1963 | Miller | 307/503 |
| 3,196,291 | 7/1965 | Woodward | 307/503 |
| 3,410,961 | 11/1968 | Slana | 307/311 |
| 3,588,671 | 6/1971 | Deboo | 328/26 |
| 4,268,789 | 5/1981 | Nagano | 323/315 |

FOREIGN PATENT DOCUMENTS 0050417 4/1982 European Pat. Off. ............ 250/551

Primary Examiner—Stanley D. Miller
Assistant Examiner—Trong Quang Phan
Attorney, Agent, or Firm—Finnegan, Henderson, Farabow, Garrett & Dunner

[57] ABSTRACT

A full wave rectifying circuit which has an operational amplifier, the noninverting input terminal of which is connected to ground and to the inverting input terminal of which an AC input voltage Vin is applied. Also included are two opposite polarity LEDs connected in parallel in a feedback loop between the output terminal and the inverting input terminal of the amplifier; photo transistors, which receive the emitted light of the LEDs and convert it to a current of corresponding value; and a load resistor which converts the current to voltage.

3 Claims, 20 Drawing Figures

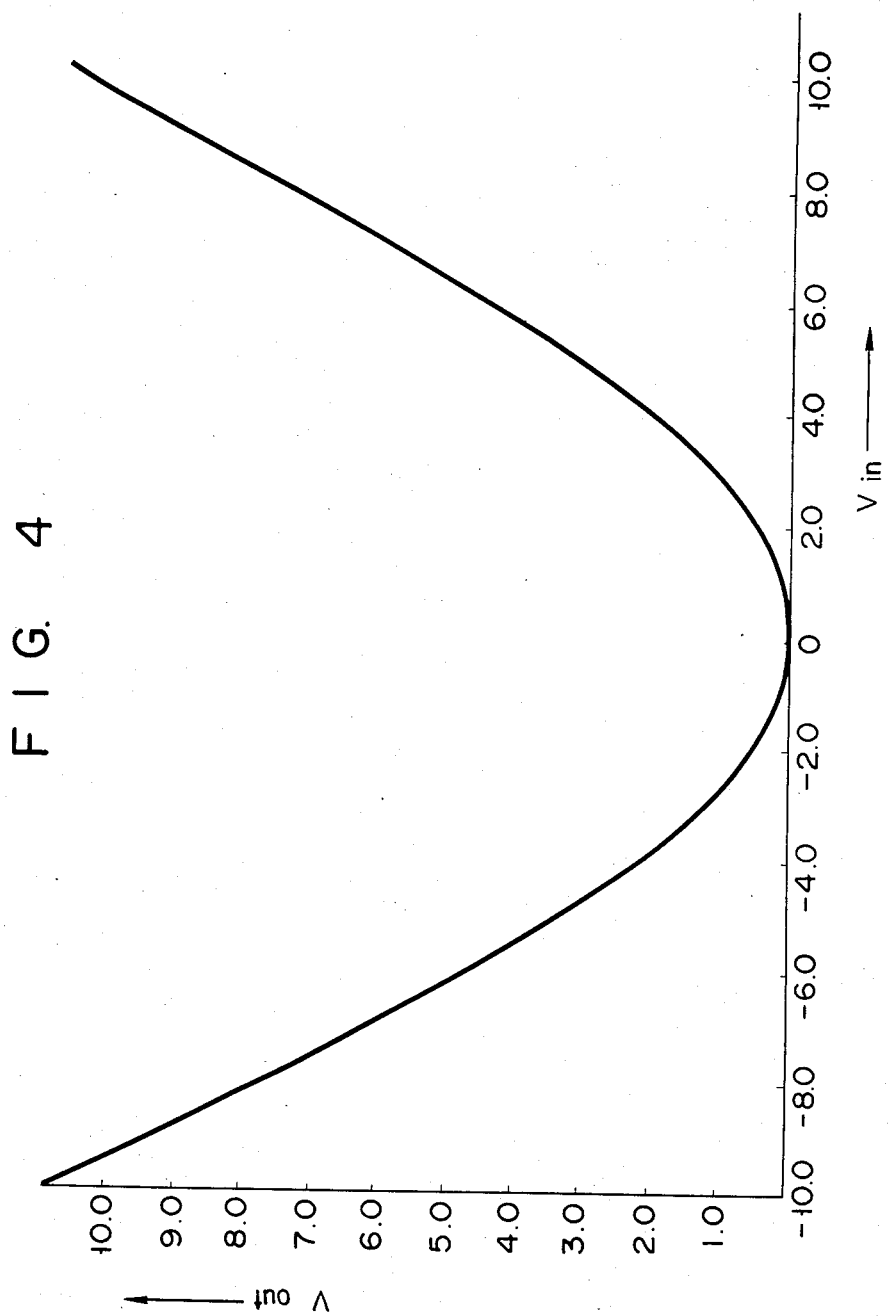

F I G. 6A 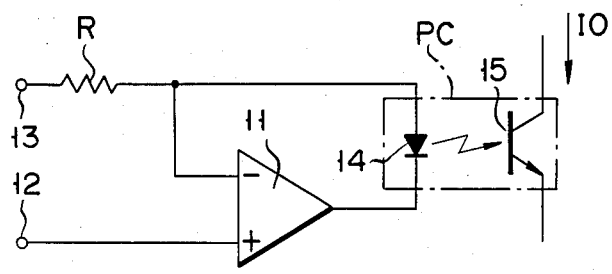 F I G. 6B 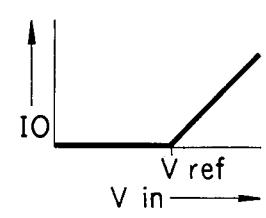
F I G. 7A 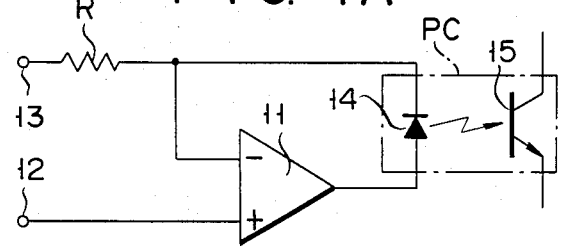 F I G. 7B 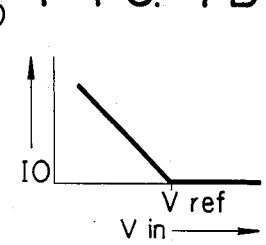
F I G. 8A 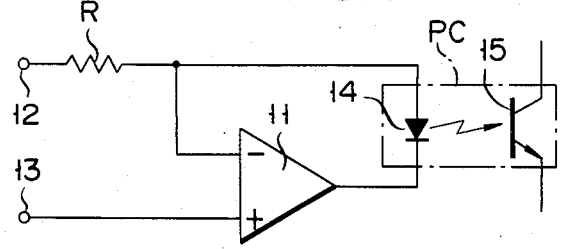 F I G. 8B 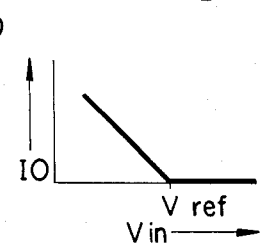
F I G. 9A 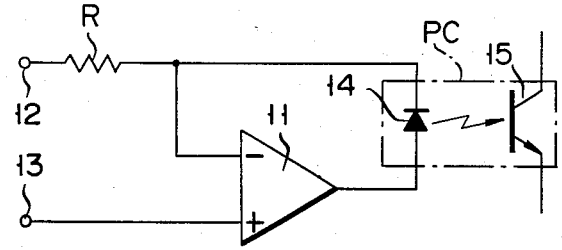 F I G. 9B 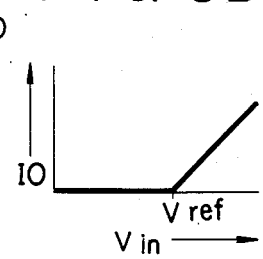

CIRCUIT IN WHICH OUTPUT CIRCUIT AND OPERATIONAL AMPLIFIER EQUIPPED INPUT CIRCUIT ARE ELECTRICALLY ISOLATED

BACKGROUND OF THE INVENTION

This invention relates to a circuit in which the output circuit and the input circuit, which includes an operational amplifier, are electrically isolated.

Many different kinds of full wave rectifying circuits are known. However, in all of these there was a circuit design limitation in the range of the level variation between the output and input voltages. Accordingly, the applicability of these circuits was circumscribed.

In order to solve this problem, a full wave rectifying circuit, which electrically isolates the input and output using a dual polarity photocoupler, has been proposed. However, in this kind of circuit, there is a decrease in the output voltage due to the forward voltage Vf of the light-emitting diode, which becomes the source of output error.

Also, function generators are known, which produce function curves, such as a voltage-current characteristic curve. In general, function generators are constructed of a plurality of limiter circuits. However, in the various prior art function generators the input and output circuits were electrically connected so that they had to be operated at the same voltage. This results in a complicated circuit structure.

SUMMARY OF THE INVENTION

An object of this invention, in consideration of the above facts, is to provide a full wave rectifying circuit which has a wide range of applications and can produce an accurate output.

Another object of this invention is to provide a function generator which can drive different input/output circuit systems with different voltage sources, thereby simplifying circuit design.

According to the invention, there is provided a full wave rectifying circuit comprising: an operational amplifier to one input terminal of which a reference voltage is applied and to the other input terminal of which an AC input voltage is applied; first and second electrophoto converting elements of mutually opposite polarity inserted in parallel in the feedback loop between the output terminal and said other input terminal of said amplifier; first and second photoelectric converting elements optically coupled with said electrophoto converting elements and mutually connected in parallel; and a load element which changes the output current of said photoelectric converting elements to voltage.

According to the invention, there is further provided a function generator comprising: a plurality of operational amplifiers; a reference voltage generating circuit for applying a different reference voltage to an input terminal of each of said plurality of amplifiers; a resistor connected between the other input terminal of each of said plurality of operational amplifiers and the input terminal to which an input voltage is applied; an electrophoto converting element connected between an output terminal of said plurality of amplifiers and said other input terminal; a plurality of photoelectric converting elements, which are optically coupled with said electrophoto converting elements and which operate when the corresponding electrophoto converting elements operate thereby forming a current path between the power source and the circuit output terminal; and a load element for converting the output current of said plurality of photoelectric converting elements into voltage.

BRIEF DESCRIPTION OF THE DRAWINGS

FIG. 4 shows the input/output voltage characteristics of the circuit shown in FIG. 3;

FIGS. 6A, 7A, 8A and 9A are the circuit diagrams of the limiter circuits which comprise the function generator of another embodiment of the invention;

FIGS. 6B, 7B, 8B and 9B show the input voltage-output current characteristics of the above limiter circuits;

DETAILED DESCRIPTION OF THE PREFERRED EMBODIMENTS

The following is a description of the embodiments of the invention taken in conjunction with the drawings.

Figure 1:
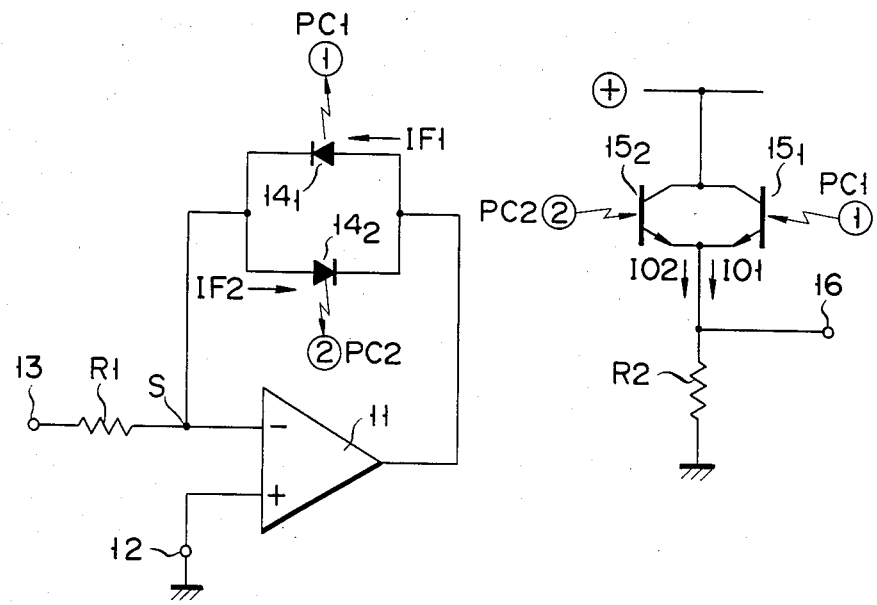
FIG. 1 shows a full wave rectifying circuit of the first embodiment of the invention.

In the full wave rectifying circuit of FIG. 1, reference numeral 11 denotes an operational amplifier (op amp) the noninverting input terminal (+) of which is connected to a reference voltage such as terminal 12, which is connected to ground GND, and the inverting input terminal (−) is connected to circuit input terminal 13, to which is applied the AC input voltage Vin, via resistor R1. A feedback loop is provided between the output terminal and the inverting input terminal (−) of op amp 11. This feedback loop includes opposite-polarity, parallel-connected first and second photoconverting elements $14_1$ and $14_2$, such as light emitting diodes (LED). This structure constitutes the input circuit.

The output circuit, on the other hand, includes same-polarity, parallel-connected first and second photoconverting elements such as photo transistors $15_1$ and $15_2$, which are optically connected to LEDs $14_1$ and $14_2$. The collectors of photo transistors $15_1$ and $15_2$ are connected to a common positive (+) power source line, and the emitters are connected to a common ground GND via load resistor R2. Circuit output 16 is connected to the emitters. Photocoupler $PC_1$ is constructed of LED $14_1$ and transistor $15_1$ and photocoupler $PC_2$ is constructed LED $14_2$ and transistor $15_2$.

The following is a description of the operation of the above rectifying circuit. As is well known, the potential difference between the inverting (−) and noninverting (+) input terminals of an op amp is zero. Accordingly, with the circuit connection shown in FIG. 1, the potential of the inverting input terminal (−) is equal to the ground potential Vref.

When the AC input voltage Vin is positive, the potential of the output terminal of amp 11 is negative (in this case, the node S between resistor R1 and inverting input terminal (−) is at ground potential) so a forward bias voltage is applied to LED $14_2$ and a reverse bias voltage is applied to LED $14_1$. Accordingly, LED $14_2$ lights up. At this time, the voltage at both ends of resistor R1 is equal to the input voltage Vin so a current IF2 with a value of the input voltage Vin divided by resistance R1 flows in LED $14_2$. The light signal produced by LED $14_2$ is received by photo transistor $15_2$ and an emitter current $I_{02}$ corresponding to this signal flows in photo transistor $15_2$. Namely, the light signal is converted to an emitter current $I_{02}$ having a corresponding size by photo transistor $15_2$. The emitter current $I_{02}$ of photo transistor $15_2$ flows to ground via resistor R2 and is converted to the voltage signal. Then the output Vout is extracted from the output terminal 16.

On the other hand, when the input voltage Vin is negative, the potential of the output terminal of amp 11 is positive (in this case, the node S is at ground potential) so a forward bias voltage is applied to LED $14_1$ and a reverse bias voltage is applied to LED $14_2$. Accordingly, LED $14_1$ lights up. At this time, the voltage at both ends of resistor R1 is equal to the input voltage Vin so a current IF1 with a value of the input voltage Vin divided by resistance R1 flows in LED $14_1$. The light signal produced by LED $14_1$ is received by photo transistor $15_1$, and an emitter current $I_{01}$ corresponding to this signal flows in photo transistor $15_1$. Namely, the light signal is converted to an emitter current $I_{01}$ having a corresponding size by photo transistor $15_1$. The emitter current $I_{01}$ of photo transistor $15_1$ is converted to the voltage signal by resistor R2 and is converted to the voltage signal, and the output Vout is extracted from the output terminal 16.

The above operation is shown by the following mathematical equations in which Vos is the input offset voltage and K1, K2 are the conversion ratios of photocouplers PC1, PC2.

When Vin >0

$$IF2 = (Vin - Vos)/R1 \quad (1)$$

$$I_{02} = K2 \cdot IF2 \quad (2)$$

$$Vout = K2(Vin - Vos)R2/R1 \quad (3)$$

When Vin >0

$$IF1 = (Vin - Vos)/R1 \quad (4)$$

$$I_{01} = -K1 \cdot IF1 \quad (5)$$

$$Vout = -K1(Vin - Vos)R2/R1 \quad (6)$$

As is clear from equations (3) and (6), the output voltage Vout is not affected by the forward voltage drop VF of the LED, and only the input offset voltage Vos of amp 11 affects the conversion of the input voltage Vin to the output voltage Vout. This input offset voltage is normally in the negligible range of several mV. Also, because the input circuits are electrically isolated by photocouplers PC1, PC2, it is possible to operate the input circuits with different power sources and, consequently, the range of applications for the device is increased.

Figure 2:
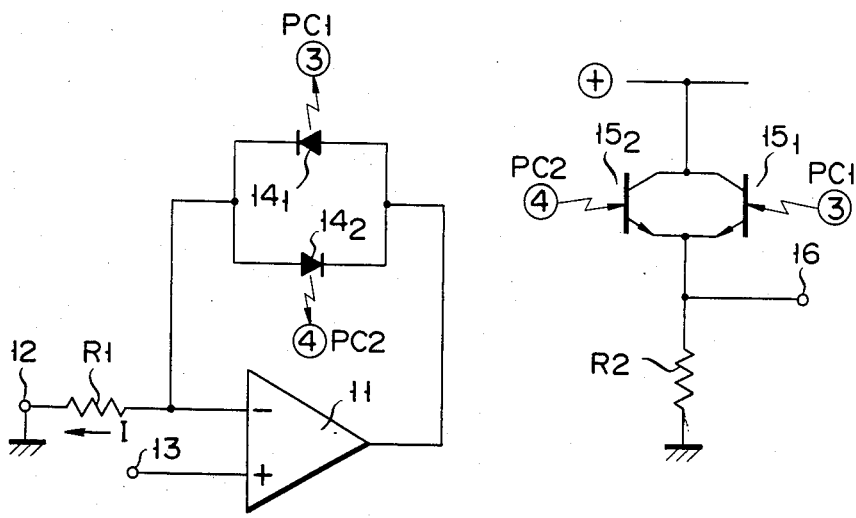
FIG. 2 shows a full wave rectifying circuit of the second embodiment of the invention.

FIG. 2 shows a full wave rectifying circuit according to another embodiment of this invention. In the embodiment of FIG. 1, amp 11 was used as an inverting amplifier, whereas in this embodiment it is used as a noninverting amplifier. Aside from this point, the electrical structure is the same as that shown in FIG. 1 so the same reference numerals have been used to denote the same parts, and description of which has been omitted.

Namely, in the embodiment of FIG. 2, the noninverting input terminal (+) of amp 11 is connected to the circuit input terminal 13, and the inverting input terminal (−) is connected to ground via resistor R1. The current shown in the following equation (7) flows in resistor R1.

$$I = (Vin - Vos)/R1 \quad (7)$$

The difference between the operation of a rectifying circuit having a structure such as that described above and that of the embodiment of FIG. 1 lies only in that when the input voltage Vin is positive or negative, the corresponding LEDs that emit light are different. Namely, in the rectifying circuit shown in FIG. 2, when the input voltage Vin is positive, LED $14_1$ lights up and photocoupler PC1 operates. Also, when the input voltage Vin is negative, LED $14_2$ lights up and photocoupler PC2 operates. The other operations are the same as in the embodiment of FIG. 1. The electrical effect of this embodiment is also the same.

Figure 3:
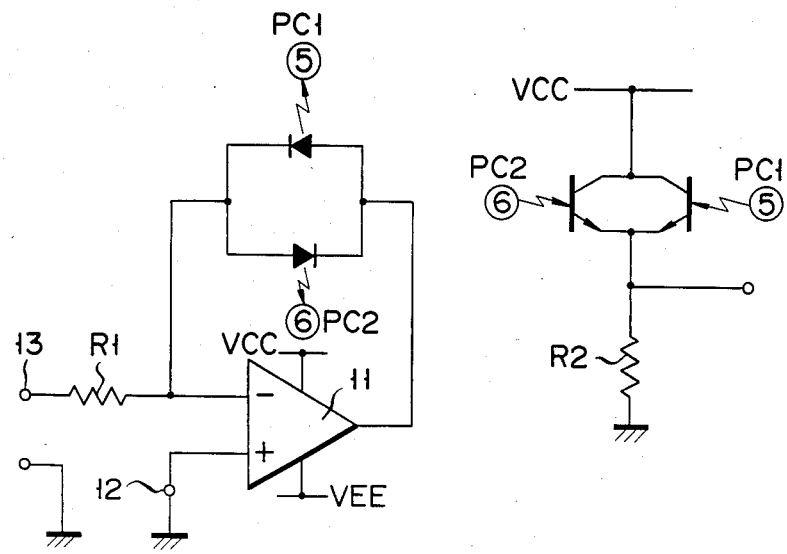
FIG. 3 shows a test circuit used to investigate the characteristics of the full wave rectifying circuit of the invention.

In order to confirm the operation of the full wave rectifier circuit shown in FIG. 1, a test circuit such as that shown in FIG. 3 was constructed and the output characteristics were measured. For op amp 11, TA7504P, manufactured by Toshiba and for photocouplers PC1, PC2, TLP521, also by Toshiba were used. The power source VCC was 15 V, VEE was −15 V, and the resistance of R1 and R2 was 10 kΩ.

The result of the experiment, is shown by the Vin-Vout characteristic curve in FIG. 4 when the input voltage Vin was varied from −10 V to +10 V. This curve is close to the absolute function of input voltage Vin. Input voltage Vin loses its linearity when it approaches 0 V. This means that the conversion efficiency of the photocoupler displays linearity in a large current region and square root characteristics in the small current region.

Figure 5:
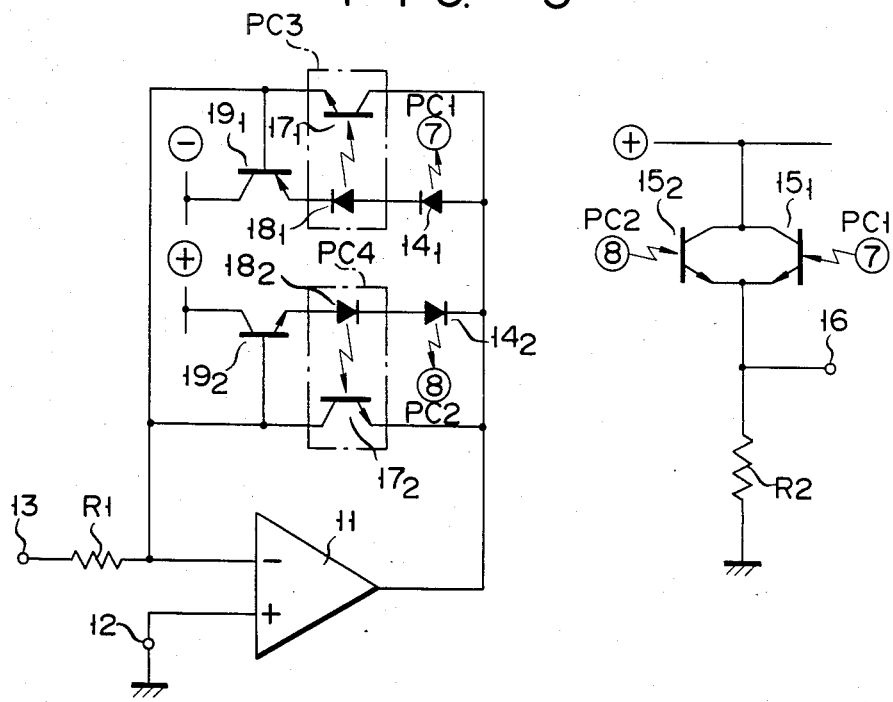
FIG. 5 shows a full wave rectifying circuit of another embodiment of the invention.

FIG. 5 shows a full wave rectifying circuit of another embodiment of this invention which can compensate the characteristics of these photocouplers in the small current region. In the drawing, the same reference numerals have been used for the same parts and description of which has been omitted. The collector-emitter path of photo transistor $17_1$ of photocoupler PC3 and the emitter-collector path of photo transistor $17_2$ of photocoupler PC4 are connected in parallel between the output terminal and inverting input terminal of op amp 11. Also, a negative power source line (−) is connected to the output terminal of op amp 11 via the anode-cathode path of LED $14_1$ of photocoupler PC1, the anode-cathode path of LED $18_1$ of photocoupler PC3, and the emitter-collector path of transistor $19_1$, which is connected to the emitter of photo transistor $17_1$.

In the construction shown in FIG. 5, photocouplers PC1 and PC3 and photocouplers PC2 and PC4 form pairs and compensate the square root characteristic in the small current regions. Namely, when the AC input voltage Vin is positive, the output of the op amp 11 becomes negative potential so a base current from input terminal 13 is supplied to transistor $19_2$ via resistor R1. Then, when transistor $19_2$ is turned ON (transistor $19_1$ is OFF at this time), a forward bias current flows in the LEDs $18_2$, $14_2$ which then emit light. The light from LED $18_2$ is received by photo transistor $17_2$ and a current corresponding to the light signal from LED $18_2$ flows in the collector-emitter path of photo transistor $17_2$. With this, the base current of the transistor $19_2$ is divided, the conductive resistance is varied and the current supplied to the LEDs $18_2$ and $14_2$ is varied. If the characteristics of the photocouplers PC2 and PC4 are the same, the current corresponding to the square root characteristic in the small current region of LED $14_2$ is divided as the collector-emitter path current of photo transistor $17_2$ so it can be compensated. Namely, a forward bias current of LED $18_2$ flows in photo transistor $17_2$ such that a current which is equal to the input current (Iin = Vin/R1) flows. The same forward bias current that flows in LED $18_2$ also flows in LED $14_2$ so the current in the collector-emitter path of photo transistor $15_2$ comes closer to the input current Iin. With this operation the square root characteristic of the photo transistor is compensated.

On the other hand, when the AC input current Vin is negative, transistor $19_1$ turns ON (transistor $19_2$ is OFF). At this time, the output of op amp 11 has a positive potential so a current flows in the negative power source line (−) via LEDs $14_1$, $18_1$ and transistor $19_1$ from the output terminal of op amp 11 and LEDs $14_1$, $18_1$ emit light. Photo transistor $17_1$ receives the light and a current corresponding to the light signal of LED $18_1$ flows in the collector-emitter path of photo transistor $17_2$. This then causes the current supplied to LEDs $14_1$, $18_1$ from op amp 11 to be divided. If the characteristics of photocoupler PC1, PC3 are the same, the current corresponding to the square root characteristic in the small current region of LED $14_1$ is divided as the collector-emitter path of photo transistor $17_1$ and this is compensated.

Namely, a forward current flows in LED $18_1$ such that a current which is equal to the input current (Iin = −Vin/R1) flows in photo transistor $17_1$. As the same forward current flows across LED $18_1$ as across LED $14_1$, the current in the collector-emitter path of photo transistor $15_1$ approaches the input current Iin. With this operation the square root characteristic is compensated.

The above was a description of a circuit in which the op amp 11 is used as an inverted amplifier and is given a square root compensation function. It is, however, possible to directly supply an AC input voltage Vin to the noninverting input terminal (+) of op amp 11 and to connect the inverting terminal (−) to ground GND via resistor R1 to thereby turn op amp 11 into a noninverting amplifier (see FIG. 2), in which case, as well, the square root characteristic of photocouplers $PC_1$ and $PC_2$ is compensated.

FIGS. 6A, 7A, 8A and 9A show the individual limiter circuits comprising a function generator. FIGS. 6B, 7B, 8B and 9B show the input/output characteristics of the above limiter circuits. In FIGS. 6A and 7A, the noninverting input terminal (+) of op amp 11 is connected to terminal 12, which applies a reference voltage Vref, such as a ground potential, and the inverting input terminal (−) is connected to terminal 13 thereby applying input voltage Vin via resistor R. A LED 14 has been inserted between output terminal and inverting input terminal (−) of op amp 11 as a photoelectric converting element. In the output circuit, the anode and cathode of LED 14 are respectively connected to the noninverting input terminal (−) and output terminal of op amp 11 is FIGS. 6A and 8A. While in FIGS. 7A and 9A, the anode and cathode connection is reversed. In FIGS. 8A and 9A, the terminal 13, which applies input voltage Vin, is connected to noninverting input terminal (+) of op amp 11 and terminal 12, which applies reference voltage Vref, is connected to noninverting input terminal (−) via resistor R. A photo transistor 15 is optically coupled to LED 14 as the photoelectric converting element. This LED 14 and photo transistor 15 comprise a photocoupler PC.

In the circuit shown in FIG. 6A, the output current Io (the collector current of photo transistor 15) flows only when the input voltage Vin is larger than the reference voltage Vref, as is shown in FIG. 6B. This relationship can be expressed as shown in the following equation (8).

When Vin ≦ Vref $$I_o = 0 \qquad (8)$$

When Vin > Vref $$I_O = K(\text{Vin} - \text{Vref})/R$$

Where K is the conductivity transmission ratio of the photocoupler PC.

In the circuit shown in FIG. 7A, on the other hand, the output current Io flows only when the input voltage Vin is smaller than the reference voltage Vref, as is shown in FIG. 7B. This relationship can be expressed as shown in the following equation (9).

When Vin < Vref $$I_O = -K(\text{Vin} - \text{Vref})/R \qquad (9)$$

When Vin ≧ Vref $$I_O = 0$$

The circuit shown in FIG. 8A has the same characteristics as the circuit shown in FIG. 7A, as can be seen in the FIG. 8B, and the circuit shown in FIG. 9A has the same characteristics as the circuit shown in FIG. 6A, as can be seen in FIG. 9B.

Figure 10:
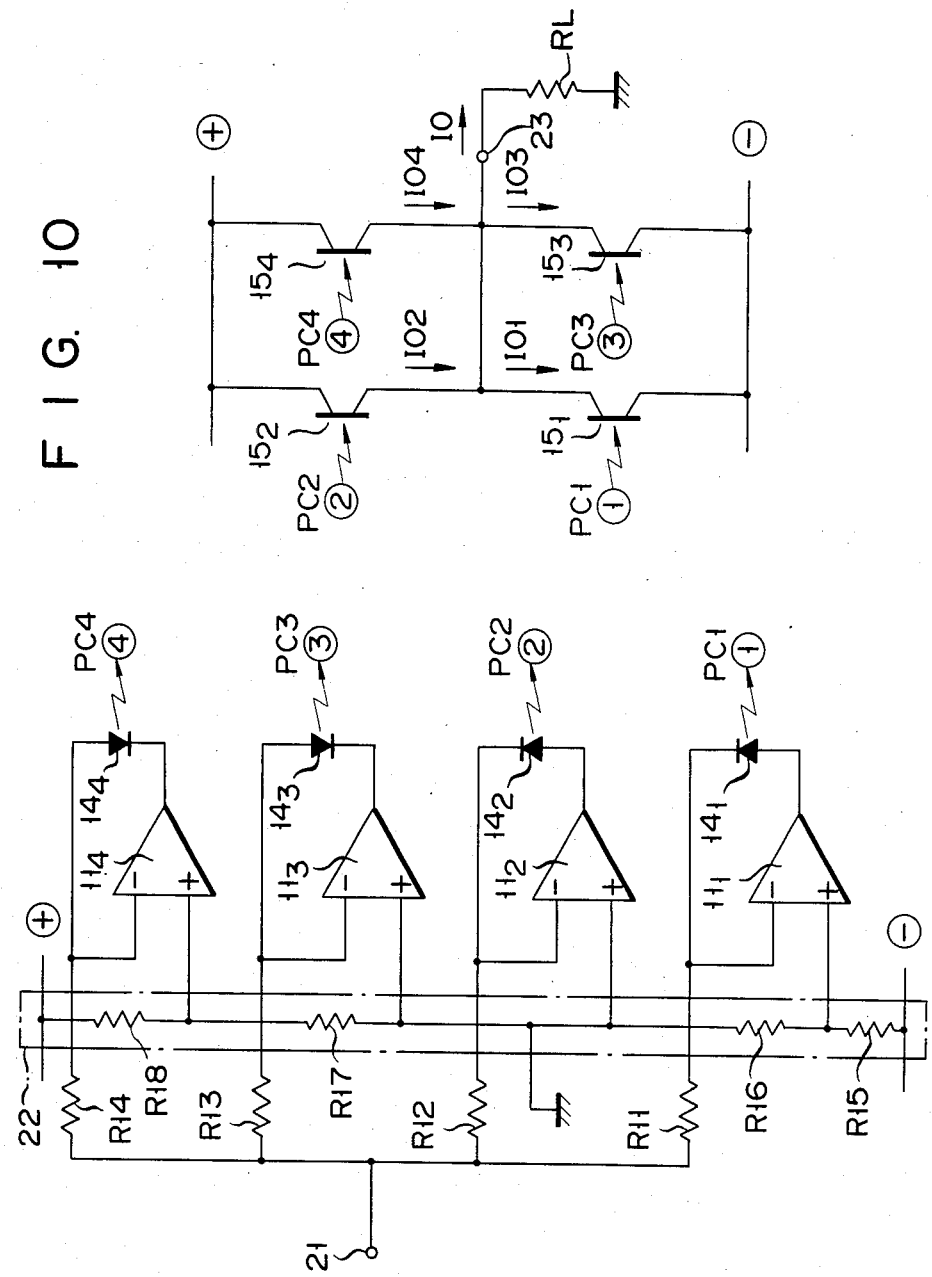
FIG. 10 is a circuit diagram of a function generator of another embodiment of the invention.

FIG. 10 shows a function generator comprised of the limiter circuits shown in FIGS. 6A and 7A. The input terminal 21, which applies input voltage Vin, is connected to the inverting input terminal (−) of each op amp $11_1$–$11_4$ via resistors $R_{11}$–$R_{14}$. Op amps $11_1$ and $11_2$ are constructed as shown in FIG. 7A and op amps $11_3$ and $11_4$ are constructed as shown in FIG. 6A. The reference voltages $\text{Vref}_1$–$\text{Vref}_4$, which are generated by reference generator circuit 22 formed of resistors R15–R18 serially connected between the positive and negative power sources, are applied to the noninverting input terminals (+) of op amps $11_1$–$11_4$. The potential increases from $\text{Vref}_1$–$\text{Vref}_4$. Ground GND is connected to a node between resistors $R_{16}$ and $R_{17}$, which are connected to the noninverting input terminals (+) of op amps $11_2$, $11_3$. The noninverting input terminal (+) of op amp $11_1$ is connected to the node between resistors $R_{15}$ and $R_{16}$, and the noninverting input terminal (+) of op amp $11_4$ is connected between resistors $R_{17}$ and $R_{18}$.

The anode-cathode path of LED $14_1$ of photocoupler $PC_1$ is connected between the inverting input terminal (−) and the output terminal of op amp $11_1$, the anode-cathode path of LED $14_2$ of photocoupler $PC_2$ is connected between that of op amp $11_2$, the cathode-anode path of LED $14_3$ of photocoupler $PC_3$ is connected between that of op amp $11_3$, and the cathode-anode path of LED $14_4$ of photocoupler $PC_4$ is connected between that of op amp $11_4$. The collector-emitter path of photo transistor $15_1$ of photocoupler $PC_1$ is connected between the negative power source and the output terminal 23, the collector-emitter path of photo transistor $15_2$ of photocoupler $PC_2$ between output terminal 23 and the positive power source, the collector-emitter path of photo transistor $15_3$ of photocoupler $PC_3$ between the output terminal 23 and the negative power source, and the collector-emitter path of photo transistor $15_4$ of photocoupler $PC_4$ between the output terminal 23 and the positive power source. Output terminal 23 is connected to ground GND via load resistor $R_l$.

The following is a description of the operation of a device having the above construction. When the input voltage Vin, which is applied to input terminal 21, is positive, op amps $11_3$, $11_4$ operate, and when the input voltage Vin is negative, op amps $11_2$, $11_1$ operate. At this time, if the transmission ratios of photocouplers $PC_1$–$PC_4$ are taken to be $K_1$–$K_4$, the output currents $I_{01}$–$I_{04}$ of photo transistors $15_1$–$15_4$ can be expressed as follows in equations (10-1)–(13-2).

When Vin < Vref $$I_{01} = K_1(Vref_1 - Vin)/R_{11} \quad (10\text{-}1)$$

When Vin ≧ Vref$_1$ $$I_{01} = 0 \quad (10\text{-}2)$$

When Vin < Vref$_2$ $$I_{02} = K_2(Vref_2 - Vin)/R_{12} \quad (11\text{-}1)$$

When Vin ≧ Vref$_2$ $$I_{02} = 0 \quad (11\text{-}2)$$

When Vin < Vref$_3$ $$I_{03} = 0 \quad (12\text{-}1)$$

When Vin ≧ Vref$_3$ $$I_{03} = K_3(Vin - Vref_3)/R_{13} \quad (12\text{-}2)$$

When Vin < Vref$_4$ $$I_{04} = 0 \quad (13\text{-}1)$$

When Vin ≧ Vref$_4$ $$I_{04} = K_4(Vin - Vref_4)/R_{14} \quad (13\text{-}2)$$

The output current $I_o$ obtained from output terminal 23 is the sum of output currents $I_{01}$–$I_{04}$ of photo transistors $Q_1$–$Q_4$ so $$I_0 = -I_{01} + I_{02} - I_{03} + I_{04} \quad (14)$$

With the construction of FIG. 10, in order to confirm the operation, a test was conducted with the resistors $R_{11}$, $R_{14}$ set at 2.5 kΩ, the resistors $R_{12}$, $R_{13}$ set at 5 kΩ, the reference voltage $Vref_1$ at −5 V, $Vref_2$, $Vref_3$ to 0 V and $Vref_4$ to 5 V. Toshiba's TA75902P were used as the op amps $11_1$–$11_4$, and TLP621 (with a current transmission ratio of nearly 1) were used as the photocouplers $PC_1$–$PC_4$.

Figure 11A:
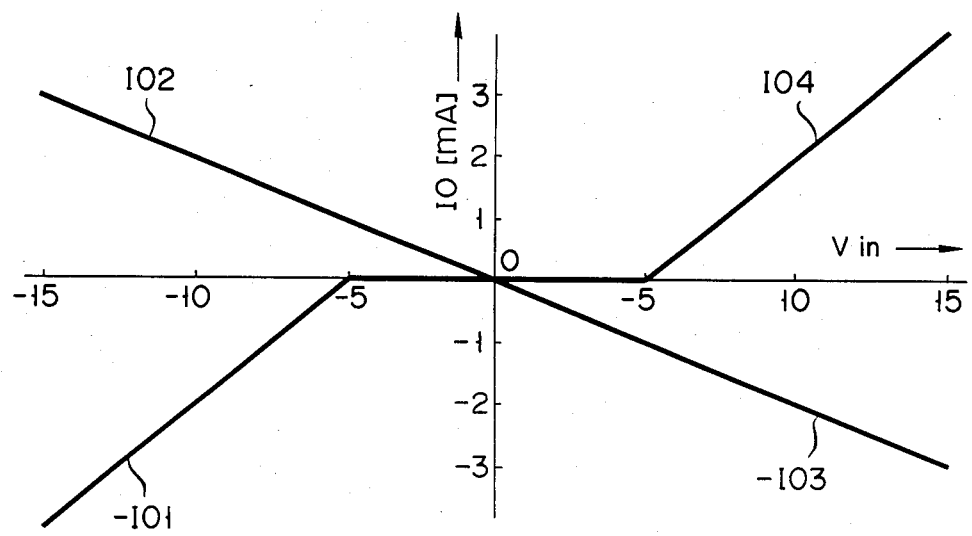
FIGS. 11A, 11B show the characteristics of the input voltage-output current of the test circuit, confirming the operation of the circuit shown in FIG. 10.
Figure 11B:
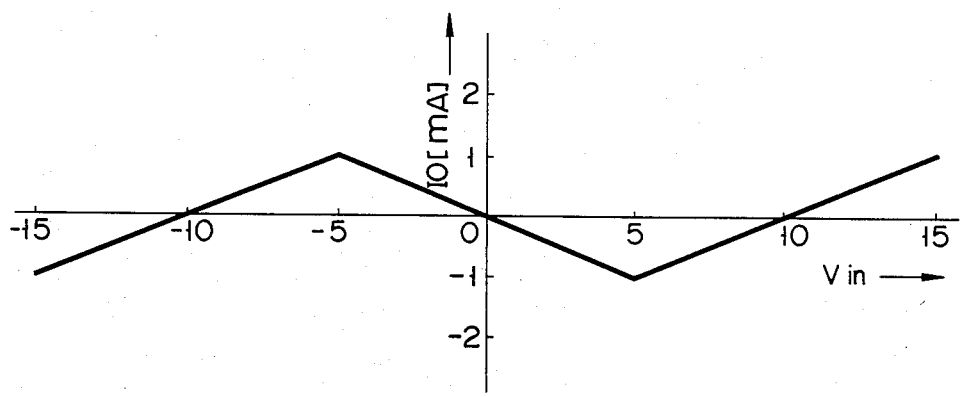

FIG. 11A shows output currents $I_{01}$–$I_{04}$ (theoretical values) of photo transistors $15_1$–$15_4$ of the function generator shown in FIG. 10. In this case, the outgoing current from output terminal 23 towards the load is taken to be in the positive direction and the ingoing current is taken to be negative. FIG. 11B shows the waveform of output current $I_0$, which is composed of the currents $I_{01}$–$I_{04}$ shown in FIG. 11A. As can be seen, the triangular wave sequentially increases and decreases. By suitably setting the levels of reference voltages $Vref_1$–$Vref_4$ the point of variation of the waveform can be set at a predetermined point, and by suitably setting the resistance values of resistors $R_1$–$R_4$, the wave slope of the output waveform can be set at a determined value. Accordingly, it is possible to obtain any function using these two characteristics.

With this kind of construction, it is possible to electrically isolate the input circuitry and the output circuitry with photocouplers $PC_1$–$PC_4$ so these circuits can be operated with different voltages, resulting in simplification of circuit design.

Figure 12:
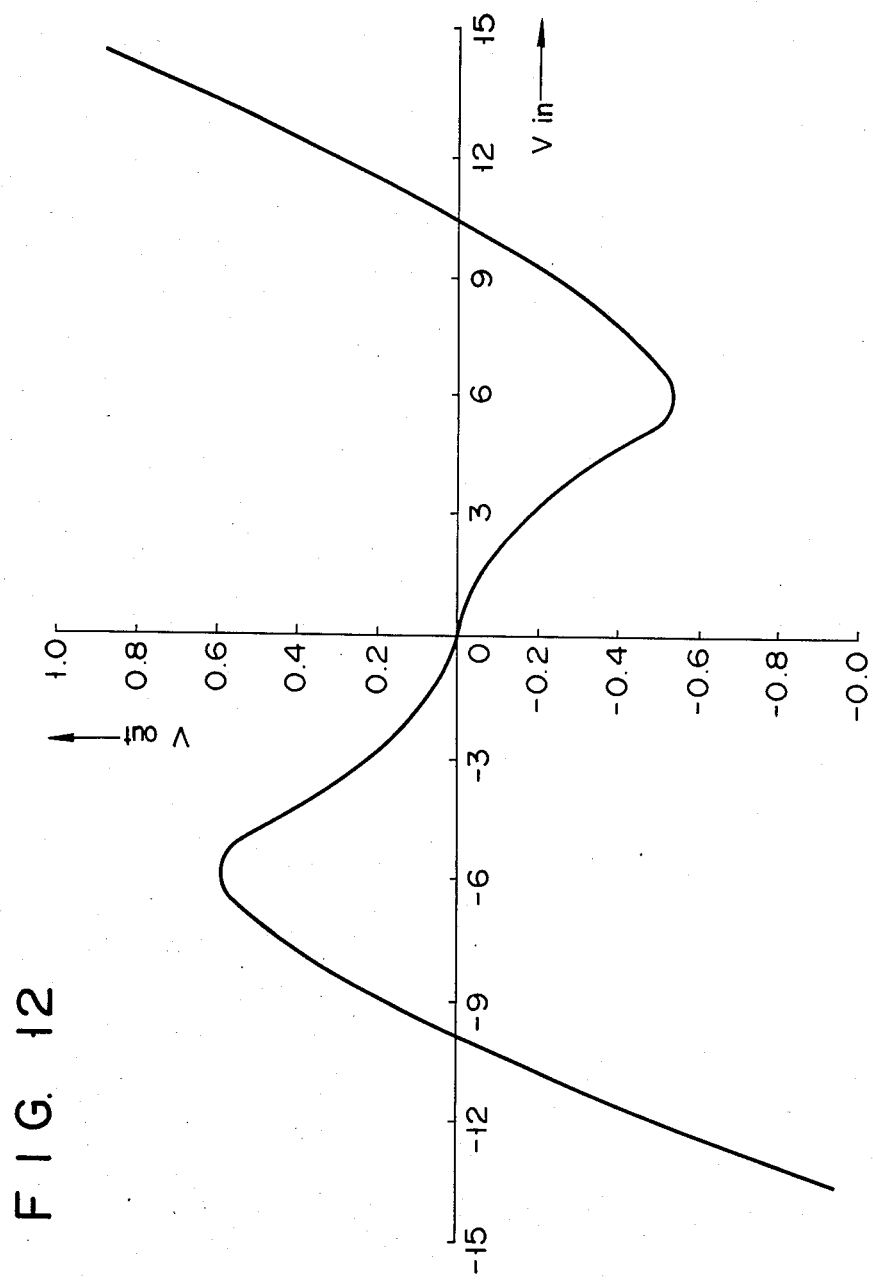
FIG. 12 shows the characteristics of the input voltage-output voltage of the test circuit built for confirming the operation of the circuit shown in FIG. 10.

FIG. 12 shows the relationship between the input voltage Vin and the output voltage Vout obtained in the above test. As can be seen, a waveform that is nearly the same as the theoretical value shown in FIG. 11B can be obtained. In order to convert the output current $I_0$ to voltage Vout, the a 1 kΩ load resistor RL was provided.

Figure 13:
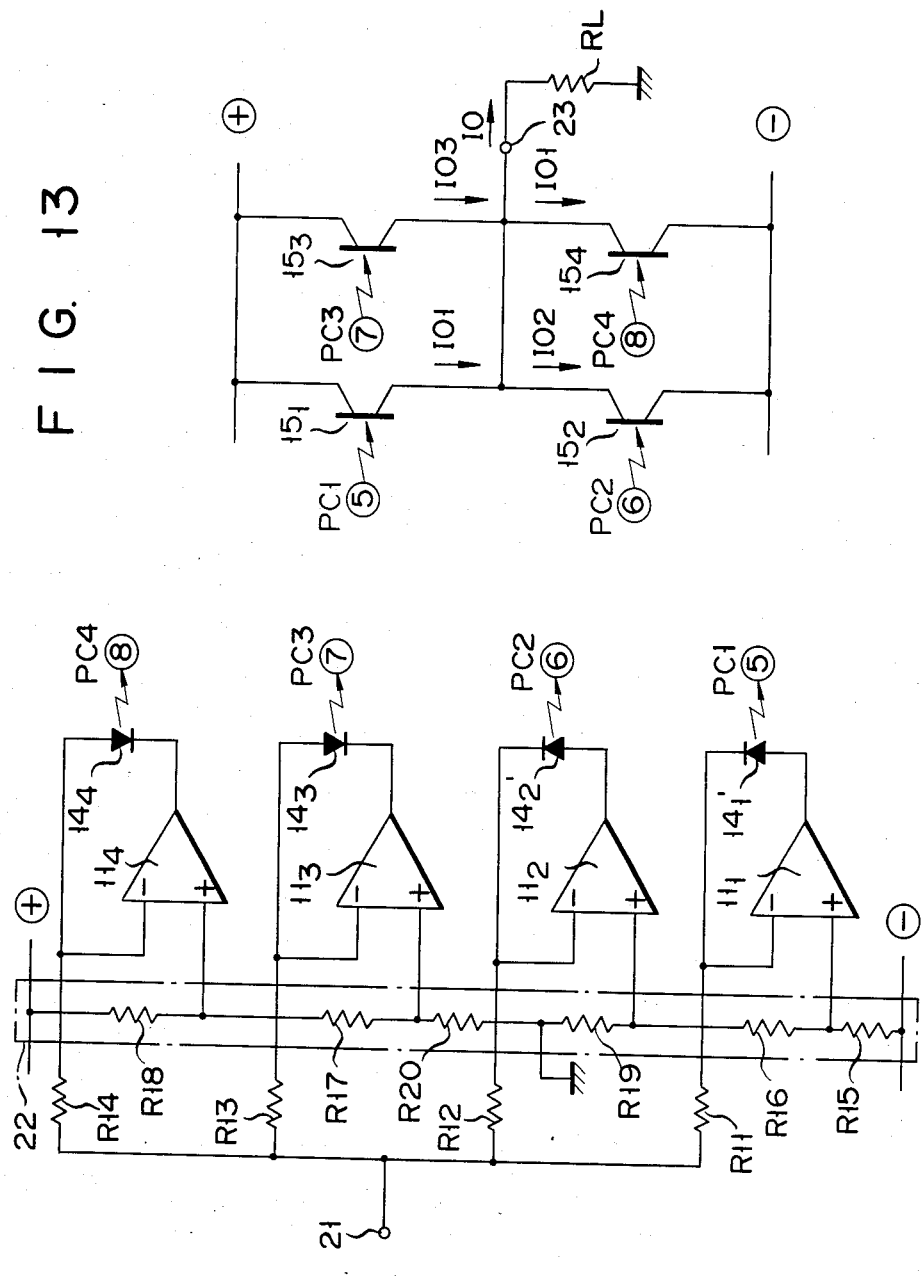
FIG. 13 shows a function generator of another embodiment of the invention.
Figure 14:
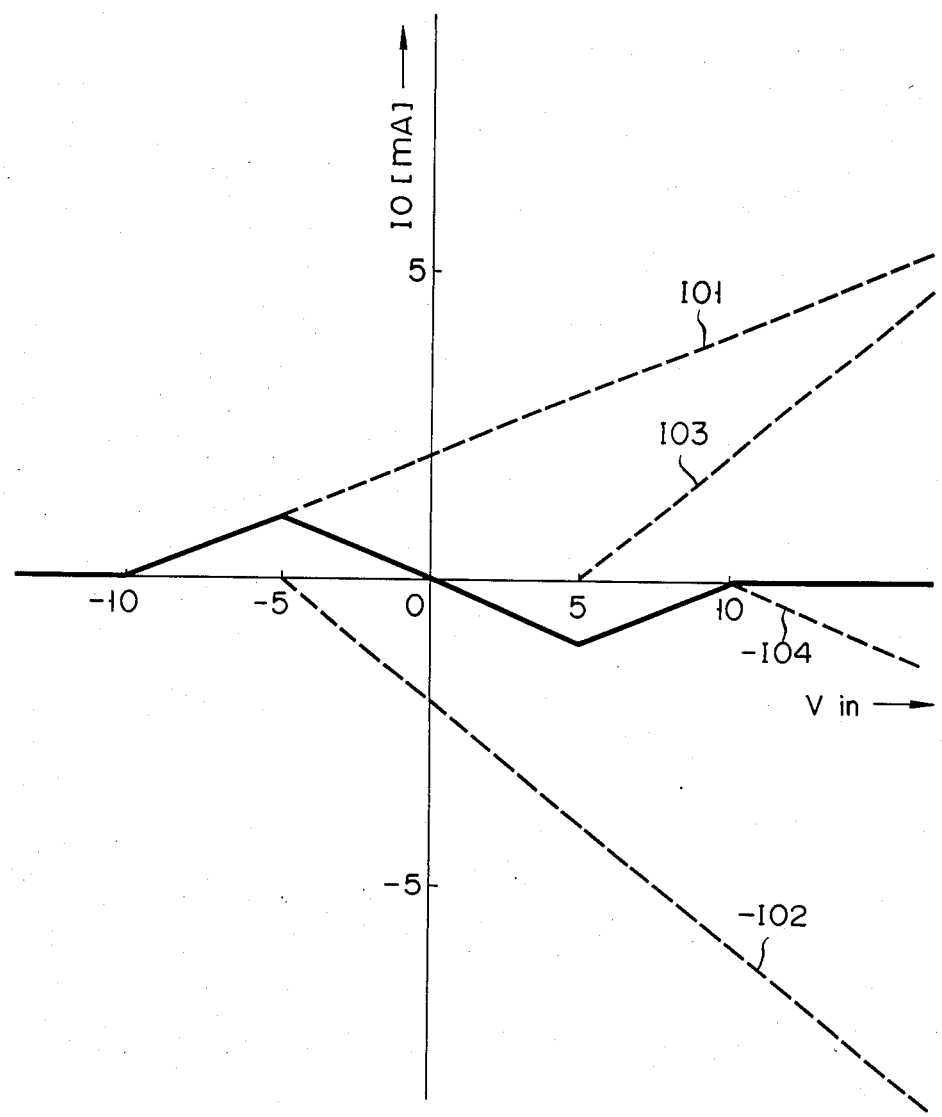
FIG. 14 shows the characteristics of the input voltage-output current of the test circuit built for confirming the operation of the circuit shown in FIG. 13.

FIG. 13 shows a function generator of another embodiment of this invention. In contrast to the function generator of FIG. 10, by setting the reference voltages $Vref_1$–$Vref_4$ and changing the connections of the photo transistors $15_1$–$15_4$, which act as the output transistors, a construction that provides different functions can be provided. The function obtained by the generator of FIG. 13 is shown in FIG. 14. This generator comprises four limiter circuits, which are shown in FIGS. 6A and 7A. In FIG. 13, the same reference numerals have been used for the same parts in FIG. 10 and a description of which has been omitted. In the circuit shown in FIG. 13, the cathode-anode path of LED $14_1$ is connected between the output terminal and inverting input terminal (−) of op amp $11_1$ and the cathode-anode path of LED $14_2$ is connected between the output terminal and inverting input terminal (−) of op amp $11_2$. In reference voltage generator circuit 22, resistor $R_{19}$ is inserted between ground and the node of noninverting input terminal (+) of op amp $11_2$ and resistor $R_{16}$, and resistor $R_{20}$ is inserted between ground and the node of the noninverting input terminal (+) of op amp 11 and resistor $R_{17}$. The collector-emitter path of photo transistor $15_1$ of the photocoupler $PC_5$ is connected between the positive power source and the output terminal 23, and the collector-emitter path of photo transistor $15_2$ of photocoupler $PC_6$ is connected between the negative power source and the output terminal 23. Furthermore, the collector-emitter path of photo transistor $15_3$ of photocoupler $PC_7$ is connected between the output terminal 23 and the positive power source, and the collector-emitter path of photo transistor $15_4$ of photocoupler $PC_8$ is connected between the output terminal 23 and the negative power source.

With this kind of structure, as well, the operation is basically the same as with the FIG. 10 embodiment and the same effect can be obtained.

Figure 15:
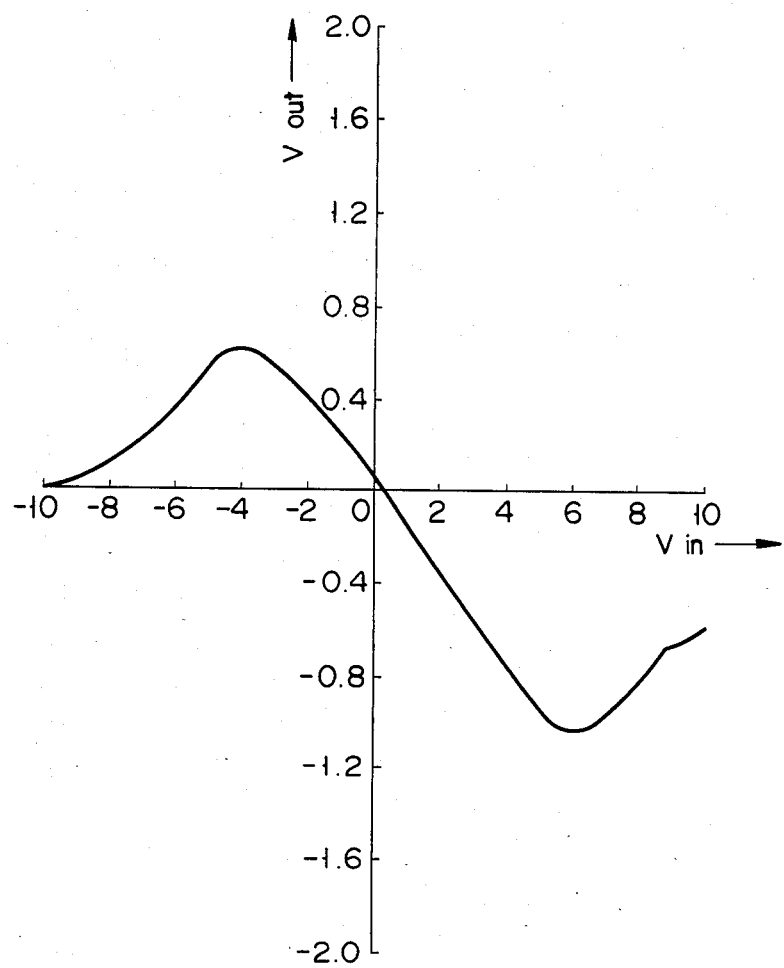
FIG. 15 shows the characteristics of the input-output voltage of the test circuit built for confirming the operation of the circuit shown in FIG. 13.

In order to confirm the operation of this circuit, resistors $R_{11}$, $R_{14}$ were set to 5 kΩ, $R_{12}$, $R_{13}$ to 2.5 kΩ, and $R_{15}$-$R_{20}$ were given equivalent resistances. A positive power source VCC of 15 V and a negative power source VEE of $-15$ V were applied, and the reference voltage $Vref_1$ was set to $-10$ V, $Vref_2$ to $-5$ V, $Vref_3$ to 5 V, and $Vref_4$ to 10 V. The op amps $11_1$-$11_4$ and the photocouplers $PC_5$-$PC_8$ were the same as those used in the test of the circuit of FIG. 10. The result of the test was a waveform of output voltage Vout in relation to variations in the input voltage Vin such as that shown in FIG. 15. Here, when the input voltage is under $-10$ V, it is possible set the output current $I_o=0$ (output voltage Vout=0 V), while when Vin is over 10 V, $I_o$ does not equal 0. The reason for this is that when the input voltage Vin is in the range of $-10$ V<Vin <10 V, the photo transistors $15_1$-$15_4$ are conductive in the forward direction. When the input voltage Vin is over 10 V, the tolerances of all the op amps $11_1$-$11_4$ are added and output. As shown in FIG. 15, however, when the input voltage Vin is in the range of $-5$ V <Vin <5 V, the circuit has a negative resistance.

In the embodiments of FIG. 10 and FIG. 13, only the cases where they comprised a combination of the limiter circuits shown in FIGS. 6A and 7A, were described. This combination, however, may be suitably selected from the circuits of FIG. 6A to FIG. 9A in response to an output function to be produced.

What is claimed is:

1. A full wave rectifier circuit comprising:
   an input terminal of the rectifier circuit;
   an output terminal of the rectifier circuit;
   an operational amplifier having first and second input terminals and an output terminal, said first input terminal of said amplifier being connected to a first power source potential, and said second input terminal of said amplifier being connected to an AC input signal;
   a feedback circuit connected between said output terminal of said amplifier and said second input terminal thereof for feeding an output signal of said amplifier back to said second input terminal thereof, said feedback circuit comprising first and second electrophoto converting elements, said first and second electrophoto converting elements being connected in parallel to each other between said output terminal of said amplifier and said second input terminal thereof, said first electrophoto converting element being connected between said output terminal of said amplifier and said second input terminal thereof so that an electric current flows through said first electrophoto converting element from said output terminal of said amplifier to said second input terminal thereof, and said second electrophoto converting element being connected between said output terminal of said amplifier and said second input terminal thereof so that an electric current flows through said second electrophoto converting element from said second input terminal of said amplifier to said output terminal thereof;
   first and second photoelectro converting elements being connected in parallel to each other between a second power source potential and said output terminal of the rectifier circuit, said first photoelectro converting element being optically connected to said first electrophoto converting element and said second photoelectro converting element being optically connected to said second electrophoto converting element; and
   a load element connected between said output terminal of the rectifier circuit and said first power source potential.

2. A full wave rectifier circuit comprising:
   an input terminal of the rectifier circuit;
   an output terminal of the rectifier circuit;
   an operational amplifier having first and second input terminals and an output terminal, said first input terminal of said amplifier being connected to a first power source potential, and said second input terminal of said amplifier being connected to an AC input signal;
   a feedback circuit connected between said output terminal of said amplifier and said first input terminal thereof for feeding an output signal of said amplifier back to said first input terminal thereof, said feedback circuit comprising first and second electrophoto converting elements, said first and second electrophoto converting elements being connected in parallel to each other between said output terminal of said amplifier and said first input terminal thereof, said first electrophoto converting element being connected between said output terminal of said amplifier and said first input terminal thereof so that an electric current flows through said first electrophoto converting element from said output terminal of said amplifier to said first input terminal thereof, and said second electrophoto converting element being connected between said output terminal of said amplifier and said first input terminal thereof so that an electric current flows through said second electrophoto converting element from said first input terminal of said amplifier to said output terminal thereof;
   first and second photoelectric converting elements being connected in parallel to each other between a second power source potential and said output terminal of the rectifier circuit, said first photoelectro converting element being optically connected to said first electrophoto converting element and said second photoelectro converting element being optically connected to said second electrophoto converting element; and
   a load element connected between said output terminal of the rectifier circuit and said first power source potential.

3. A full wave rectifier circuit comprising:
   an input terminal of the rectifier circuit;
   an output terminal of the rectifier circuit;
   an operational amplifier having first and second input terminals and an output terminal, said first input terminal of said amplifier being connected to a first power source potential and said second input terminal of said amplifier being connected to an AC input signal;
   a feedback circuit connected between said output terminal of said amplifier and said second input terminal thereof for feeding an output signal of said amplifier back to said second input terminal thereof, said feedback circuit comprising first and second circuits connected in parallel between said output terminal of said amplifier and said second input terminal thereof, said first circuit comprising first and second electrophoto converting elements, a first switching element having a control terminal connected to said second input terminal, and a first photoelectro converting element having an output terminal, said first and second electrophoto converting elements and said first switching element being connected in series between said output terminal of said amplifier and a second power source potential higher than said first power source potential so that, when said first switching element is turned on, an electric current flows through said first and second electrophoto converting elements and said first switching element between said output terminal of said amplifier and said second power source potential, said first photoelectro converting element being connected between said output terminal of said amplifier and said second input terminal thereof, said first photoelectro converting element being optically connected to said first electrophoto converting element, said output terminal of said first photoelectro converting element being connected to said control terminal of said first switching element, said second circuit comprising third and fourth electrophoto converting elements, a second switching element having a control terminal connected to said second input terminal, and a second photoelectro converting element, said third and fourth electrophoto converting elements and said second switching element being connected in series between said output terminal of said amplifier and a third power source potential lower than said first power source potential so that, when said second switching element is turned on, an electric current flows through said third and fourth electrophoto converting elements and said second switching element between said third power source potential and said output terminal of said amplifier, said second photoelectro converting element being connected between said output terminal of said amplifier and said second input terminal thereof, and said second photoelectro converting element being optically connected to said third electrophoto converting element;

third and fourth photoelectro converting elements being connected in parallel to each other between said second power source potential and said output terminal of the rectifier circuit, said third photoelectro converting element being optically connected to said second electrophoto converting element, and said fourth photoelectro converting element being optically connected to said fourth electrophoto converting element; and a load element connected between said output terminal of the rectifier circuit and said first power source potential.

* * * * *